United States Patent
Eda et al.

(10) Patent No.: US 9,451,083 B1
(45) Date of Patent: Sep. 20, 2016

(54) COMMUNICATION ANSWERING TIME ESTIMATION

(71) Applicant: International Business Machines Corporation, Armonk, NY (US)

(72) Inventors: Sasikanth Eda, Andhra Pradesh (IN); Deepak R. Ghuge, Ahmednagar (IN); Sandeep R. Patil, Pune (IN); Gandhi Sivakumar, Melbourne (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/816,288

(22) Filed: Aug. 3, 2015

(51) Int. Cl.
    H04M 3/42    (2006.01)
    H04W 4/16    (2009.01)
    H04W 4/02    (2009.01)

(52) U.S. Cl.
    CPC ......... H04M 3/42093 (2013.01); H04W 4/023 (2013.01); H04W 4/16 (2013.01)

(58) Field of Classification Search
    CPC .. H04M 3/42093; H04W 4/023; H04W 4/16
    USPC ................ 455/414.1, 567, 404.1; 705/7.12
    See application file for complete search history.

(56) References Cited

U.S. PATENT DOCUMENTS

| | | |
|---|---|---|
| 8,274,386 B1 | 9/2012 | Dea et al. |
| 8,374,628 B1* | 2/2013 | Nelissen ............... H04W 4/023 455/414.1 |
| 2002/0177928 A1* | 11/2002 | Moriguchi .......... H04M 1/6091 701/1 |
| 2007/0037605 A1 | 2/2007 | Logan |
| 2009/0181651 A1* | 7/2009 | Klassen ............. H04M 1/72547 455/414.1 |
| 2010/0144321 A1* | 6/2010 | Katis ....................... H04L 67/32 455/412.2 |
| 2010/0273443 A1 | 10/2010 | Forutanpour et al. |
| 2012/0059681 A1 | 3/2012 | Meyer et al. |
| 2012/0315880 A1 | 12/2012 | Peitrow et al. |
| 2014/0347188 A1 | 11/2014 | Alameh et al. |

FOREIGN PATENT DOCUMENTS

| | | |
|---|---|---|
| EP | 2524489 A2 | 11/2012 |
| JP | 2009188725 A * | 8/2009 |

OTHER PUBLICATIONS

Anonymous, "System and method to dynamically update the caller on the availability of the callee before connecting the call.", IP.com No. 000240942, Publication: Mar. 12, 2015, 4 pages.

Mell et al., "The NIST Defininition of Cloud Computing", Special Publication 800-145, Sep. 2011, 7 pages.

* cited by examiner

*Primary Examiner* — Charles Shedrick
(74) *Attorney, Agent, or Firm* — Reza Sarbakhsh; Jennifer M. Anda (57) ABSTRACT

Embodiments of the present invention may relate generally to the field of computing, and more particularly to estimating an answering time by a user of a communication on a communication device. A user may receive a communication on a first communication device from a second communication device. A distance of the user from the first communication device may be determined. A time may be estimated for the user to reach the first communication device based on the distance determination. The time estimation may be communicated to the second communication device.

20 Claims, 5 Drawing Sheets

COMMUNICATION ANSWERING TIME ESTIMATION

BACKGROUND

The present invention relates generally to the field of computing, and more particularly to a communication answering time estimation.

A time to answer a phone call, text message, or other communication may vary among users and circumstances. Conventional communication devices may not determine a time it may take a user to answer an incoming communication. Thus, a means for estimating a time for a user to answer an incoming communication is needed.

SUMMARY

Embodiments of the present invention disclose a method for estimating an answering time by a user of a communication on a communication device. The method may include receiving a communication on a first communication device from a second communication device. A distance of a user from the first communication device may be determined. A time may be estimated for the user to reach the first communication device based on the distance determination. The estimated time may be communicated to the second communication device.

Embodiments of the present invention disclose a computer program product for estimating an answering time by a user of a communication on a communication device. A first communication device may receive a communication from a second communication device. A computer may determine a distance of a user from the first communication device. A computer may estimate a time for the user to reach the first communication device based on the distance determination. A computer may communicate the estimated time to the second communication device.

Embodiments of the present invention disclose a system for estimating an answering time by a user of a communication on a communication device. The system may include program instructions to receive a communication on a first communication device from a second communication device. The system may include program instructions to determine a distance of a user from the first communication device. The system may include program instructions to estimate a time for the user to reach the first communication device based on the distance. The system may include program instructions to communicate the estimated time to the second communication device.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Embodiments of the present invention may relate to a communication answering time estimation. When making a phone call, a caller may not have information regarding a time needed for a callee to answer a call. A caller may not have information regarding a distance with which a callee is from a phone being called by the caller. When a callee is far from a phone being called, a caller may wait a substantial time before a call may be answered or a call may not be answered. Thus, a method for providing an estimated answering time based on a distance of a user from a phone is needed.

Embodiments of the present invention may relate to a communication answering time estimation system based on a user's proximity to a communication device. A user may receive a communication on a first communication device from a second communication device. A communication may include, for example, a phone call, text message, email, social media message, or other communication. In an embodiment, the user may be a callee (e.g. a person receiving a phone call). The second communication device may include, for example, the caller's phone. A distance of the user from the first communication device may be determined. A time may be estimated for the user to reach the first communication device based on the distance determination. The time estimation may be communicated to the second communication device. In an embodiment, the second communication device may display the time estimation. Embodiments of the present invention will now be described in detail with reference to FIGS. 1-5.

Figure 1:
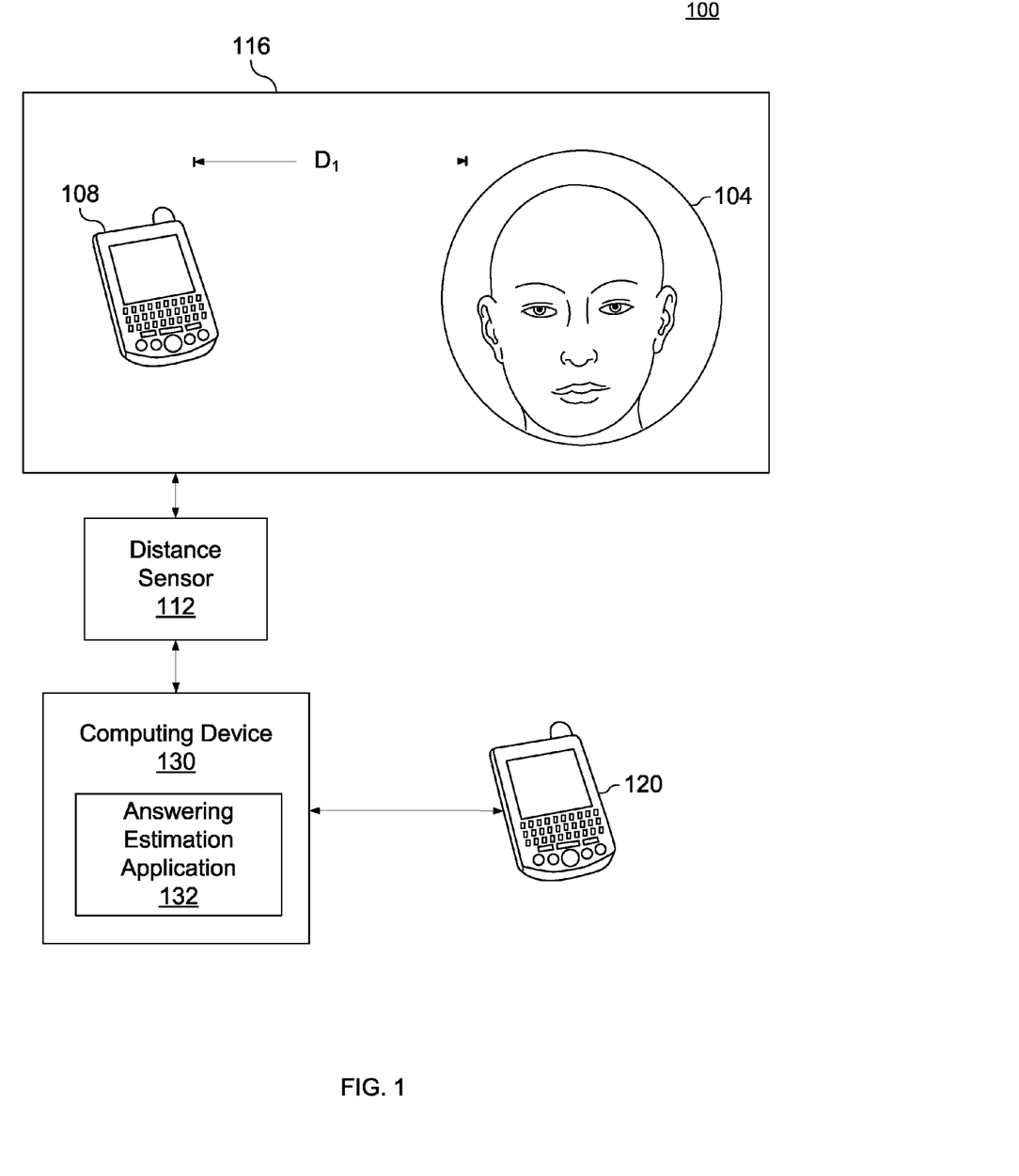
FIG. 1 is a functional block diagram illustrating a phone call answering time estimation system, in accordance with an embodiment of the present invention.

FIG. 1 is a communication answering time estimation system 100 (hereinafter "estimation system"), according to an aspect of the invention. In an exemplary embodiment, the estimation system 100 may include a callee's phone 108, a distance sensor 112, a distance Di between the callee's phone and a callee 104, a callee phone environment 116, a computing device 130, an estimation application 132, and a caller's phone 120. The estimation application 132 may be a program, function, or module of a computer program (not shown) executable by a processor of the estimation system 100, or may be embodied as one or more connected computing systems. Estimation system 100 may be implemented using a computing node such as the computing node of FIG. 4.

Computing device 130 may be a laptop computer, tablet computer, netbook computer, personal computer (PC), desktop computer, smart phone, or any programmable electronic device. For example, computing device 130 may be within a callee's phone 108. In another example, computing device 130 may be within caller's phone 120. In another example, computing device 130 may be a remote computing device, such as, for example, a cloud computing device. Computing device 130 may include internal and external hardware components, as depicted and described in further detail with respect to FIG. 3. Computing device 130 may include an estimation application 132.

The distance sensor 112 may determine the distance Di between the callee's phone 108 and the callee 104. The distance sensor 112 may be any distance sensing device known in the art, such as, for example, a capacitive sensor, capacitive displacement sensor, Doppler effect sensor, eddy-current sensor, inductive sensor, laser rangefinder sensor, magnetic sensor, magnetic proximity fuse sensor, passive optical sensor, passive thermal infrared sensor, photocell sensor, radar sensor, ionizing radiation sensor, sonar sensor, ultrasonic sensor, fiber optics sensor, hall effect sensor, or any combination thereof. In another embodiment, the distance sensor 112 may be a device capable of communicating with a wearable device. For example, the distance sensor 112 may request location information from the wearable device and receive location information from the wearable device. In a preferred embodiment, the distance sensor 112 may be an infrared sensor. For example, the infrared sensor may bounce infrared light off of an object to determine a distance between the infrared sensor and the object. In another example, the infrared sensor may measure black body radiation emitted from an object to determine a distance between the infrared sensor and the object. In an embodiment, the distance sensor 112 may be located within the callee's phone 108. In another embodiment, the distance sensor 112 may not be located within the callee's phone 108.

The distance sensor 112 may detect zero, one, or more objects. Objects detected by a distance sensor may include, for example, a person, animal, furniture, automobile, building, etc. Data collected by the distance sensor 112 may be transmitted to the computing device 130. In an embodiment, the computing device 130 may examine the data provided by the distance sensor 112 to identify the callee 104. As is discussed in detail below, the computing device 130 may examine the data provided by the distance sensor 112 to determine a distance between the callee 104 and the callee's phone 108. In addition, as is discussed in detail below, the computing device 130 may utilize the distance determination to estimate a time for the callee 104 to reach the callee's phone 108.

In an embodiment, the callee 104 may be a regular user of the callee's phone 108, a non-regular user of the callee's phone 108, or any combination thereof. For example, the callee 104 may own and use the callee's phone 108 regularly. In another example, the callee 104 may be a third person who does not use the callee's phone 108 regularly. The non-regular user may be, for example, a person who does not have a phone or whose phone is non-operative. Call history and other call data may be used to determine that the caller intends to call the non-regular user. In addition, previous call history and other call data may be used to identify the callee 104, as discussed below.

Figure 2:
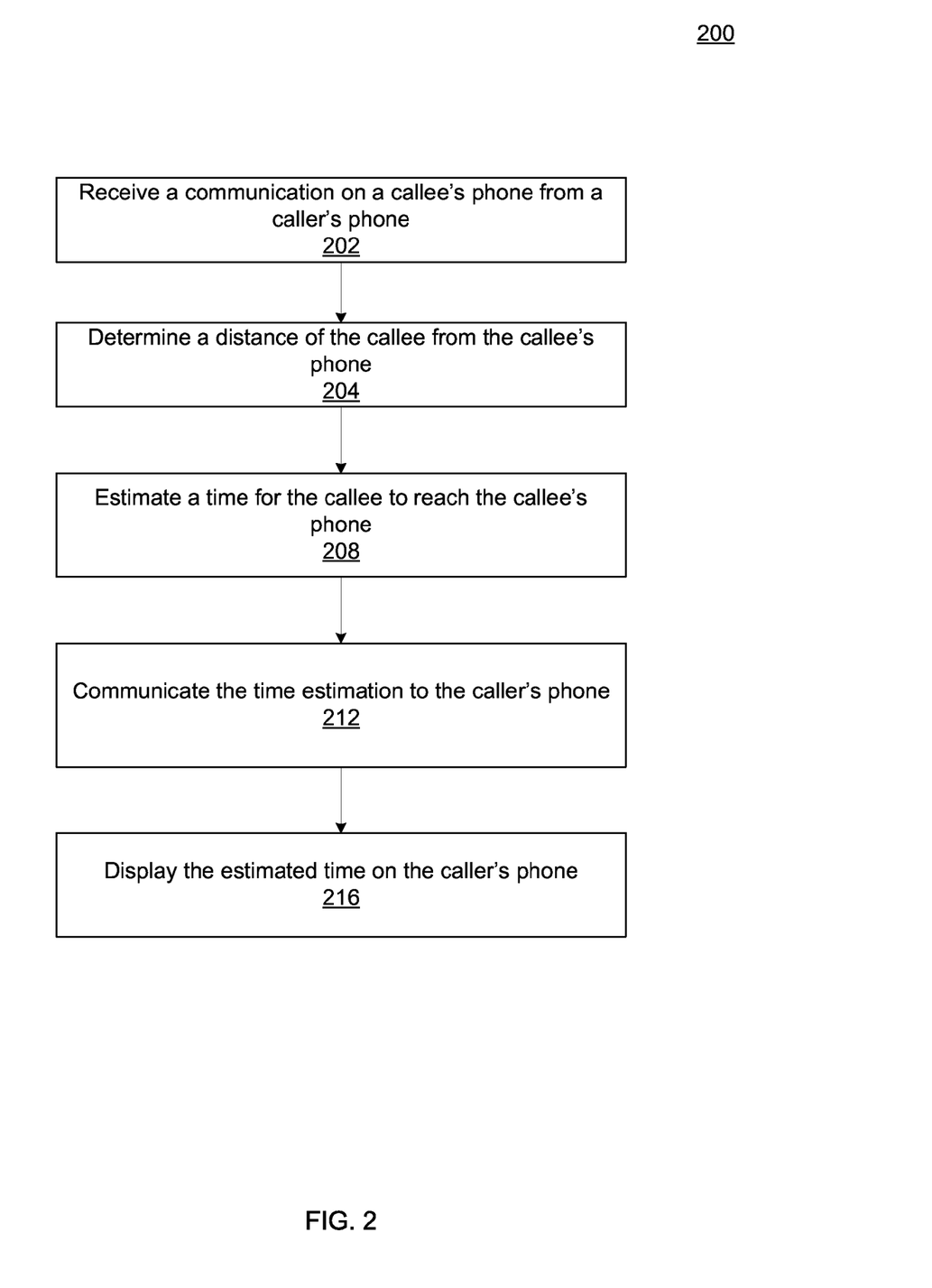
FIG. 2 is a flowchart depicting operational steps of phone call answering time estimation program, in accordance with an embodiment of the present invention.

FIG. 2 is a flowchart of a method 200 for phone call answering time estimation, using the estimation system 100 of FIG. 1, in accordance with an embodiment of the present invention. Steps of method 200 may be executed using a processor of a computer that encompasses, or is part of, estimation system 100, or another system. In an embodiment, a method 200 of phone call answering time estimation may involve receiving a communication on a callee's phone 108 from the caller's phone 120 (hereinafter "receiving communication 202"), determining a distance between the callee 104 and the callee's phone 108 (hereinafter "distance determination 204"), estimating a time for the callee 104 to reach the callee's phone 108 (hereinafter "time estimation 208"), transmitting data to the caller's phone (hereinafter "transmitting 212"), and displaying the time estimation 208 on the caller's phone 120 (hereinafter "displaying 216").

Receiving communication 202 may involve the callee's phone 108 receiving one or more communications from the caller's phone 120. The one or more communications may include, for example, a phone call, text message, e-mail, social media message, emergency alert, or any combination thereof.

Distance determination 204 may involve determining a distance between the callee 104 and the callee's phone 108. Distance determination 204 may be made using any measurement method known in the art, such as, for example, capacitive measurement, capacitive displacement measurement, Doppler effect measurement, eddy-current measurement, inductive measurement, laser rangefinder measurement, magnetic measurement, magnetic proximity fuse measurement, passive optical measurement, passive thermal infrared measurement, photocell measurement, radar measurement, ionizing radiation measurement, sonar measurement, ultrasonic measurement, fiber optics measurement, hall effect measurement, or any combination thereof. In a preferred embodiment, the distance determination 204 may be made using an infrared measurement. For example, the infrared measurement may involve bouncing infrared light off of an object to determine a distance between the infrared sensor and the object. In another example, the infrared measurement may involve measuring black body radiation emitted from an object to determine a distance between the infrared sensor and the object.

In an embodiment, the distance determination 204 may involve identifying the callee 104. In an embodiment, one or more objects may be detected by the distance sensor 112. For example, one or more persons may be detected by the distance sensor 112. In an embodiment, the distance sensor 112 may perform a thermal scan of the one or more persons within a reading range and transmit thermal scan data to the computing device 130. Thermal scan data may include a thermal gradient, shape, size, temperature, etc. The computing device 130 may compare the thermal scan data of the one or more persons to determine which person, if any, match a thermal profile of the callee 104. If any person detected in the thermal scan matches the thermal profile of the callee 104, then the callee 104 may be identified as the person detected in the thermal scan. The thermal scan information may be used to determine a distance of the callee 104 by comparing a perceived size of the callee 104 with an actual size of the callee 104. In another embodiment, the distance sensor 112 may communicate with a wearable device to perform the distance determination 204. For example, a wearable device may be attached to the callee 104. By communicating with the wearable device, the distance sensor 112 may determine a location of the wearable device. The location of the wearable device may be the same as the location of the callee 104. Thus, by determining the location of the wearable device, the distance sensor 112 may determine the location of the callee 104. The distance determination may be repeated one or more times to provide one or more distance updates.

Time estimation 208 may involve approximating a time that it may take for the callee 104 to reach the callee's phone 108. In an embodiment, time estimation 208 may utilize one or more data points, such as, for example, the distance determination 204, a prior record of time for the callee 104 to reach the callee's phone 108, a record of time for one or more other persons to reach one or more other phone, an age of the callee 104, a health condition of the callee 104, a speed rating of the callee 104, a sleep status of the callee 104, time of day, or any combination thereof. In a preferred embodiment, time estimation 208 may utilize the distance determination 204. A prior record of time for the callee 104 to reach the callee's phone 108 may have been recorded in one or more prior communications. The prior record of time for the callee 104 may be stored on a computer readable storage medium, such as, for example, computing device 130. A record of time for one or more other persons to reach one or more other phone may have been recorded in one or more prior communications. The prior record of time for one or more other persons may be stored on a computer readable storage medium, such as, for example, computing device 130. An age of the callee 104 may be provided by the callee 104 or gathered from another source, such as, for example, medical records, social media account, etc. A health condition of the callee 104 may be provided by the callee 104 or gathered from another source, such as, for example, medical records, social media account, wearable device, etc. A speed rating of the callee 104 may be calculated based on data provided by the callee 104 or gathered from another source, such as, for example, the prior record of time for the callee 104, wearable device, etc. A sleep status of the callee 104 may be determined by one or more devices, such as, for example, a biometric device, wearable device, callee's phone 108, distance sensor 112, or any combination thereof.

In an embodiment, the time estimation 208 may adjust an estimation based on one or more actions of the callee 104. For example, the time estimation 208 may utilize distance information from the distance determination 204 to determine whether or not the callee 104 is moving. If the callee 104 is not moving, the time estimation 208 may increase accordingly. If the callee 104 is moving toward the callee's phone 108, the time estimation 208 may decrease accordingly. If the callee 104 is moving away from the callee's phone 108, the time estimation may increase accordingly. In another example, the callee 104 may have a pattern of rejecting calls from the caller's phone 120 and the time estimation 208 may be adjusted accordingly.

Communicating 212 may involve transferring data from the computing device 130 to the caller's phone 120. In an embodiment, the computing device 130 may be located within the caller's phone 120, and thus, communicating 212 may not occur or may occur internally. In another embodiment, the computing device 130 may not be located within the caller's phone 120, and thus, communicating 212 may transfer data from the computing device 130 to the caller's phone 120. The data transferred may include, for example, the time estimation 208, the distance determination 204, thermal scan data, mapping and/or dimensional information, or any combination thereof. Mapping and/or dimensional information may include, for example, one or more locations of one or more objects, one or more distances between one or more objects, one or more speeds of one or more objects, one or more accelerations of one or more objects, one or more dimensions of one or more objects, or any combination thereof. For example, a location of the callee 104 and a location of the callee's phone 108 along with a speed and direction of travel of the callee 104 may be transmitted during communicating 112. In a preferred embodiment, communicating 212 may involve transferring the time estimation 208 from the computing device 130 to the caller's phone 120.

Displaying 216 may involve showing an image and/or text on the caller's phone 120. In an embodiment, displaying 216 may display any information regarding, for example, the callee 104, the callee's phone 108, the distance Di, the distance determination 204, one or more persons detected by the distance sensor 112, thermal scan data, the time estimation 208, or any combination thereof. Information regarding the callee 104 may include, for example, real time information detected by the distance sensor 112 or another sensor, or data of the callee 104 previously detected by the distance sensor 112 or another sensor.

In a preferred embodiment, the displaying 216 may involve showing the time estimation 208. In another embodiment, the displaying 216 may involve showing a dimensional representation of the callee phone environment 116. A dimensional representation of the callee phone environment 116 may include, for example, a map showing the location of the callee's phone 108 and the location of the callee 104 and/or one or more objects detected by the distance sensor 112.

Figure 3:
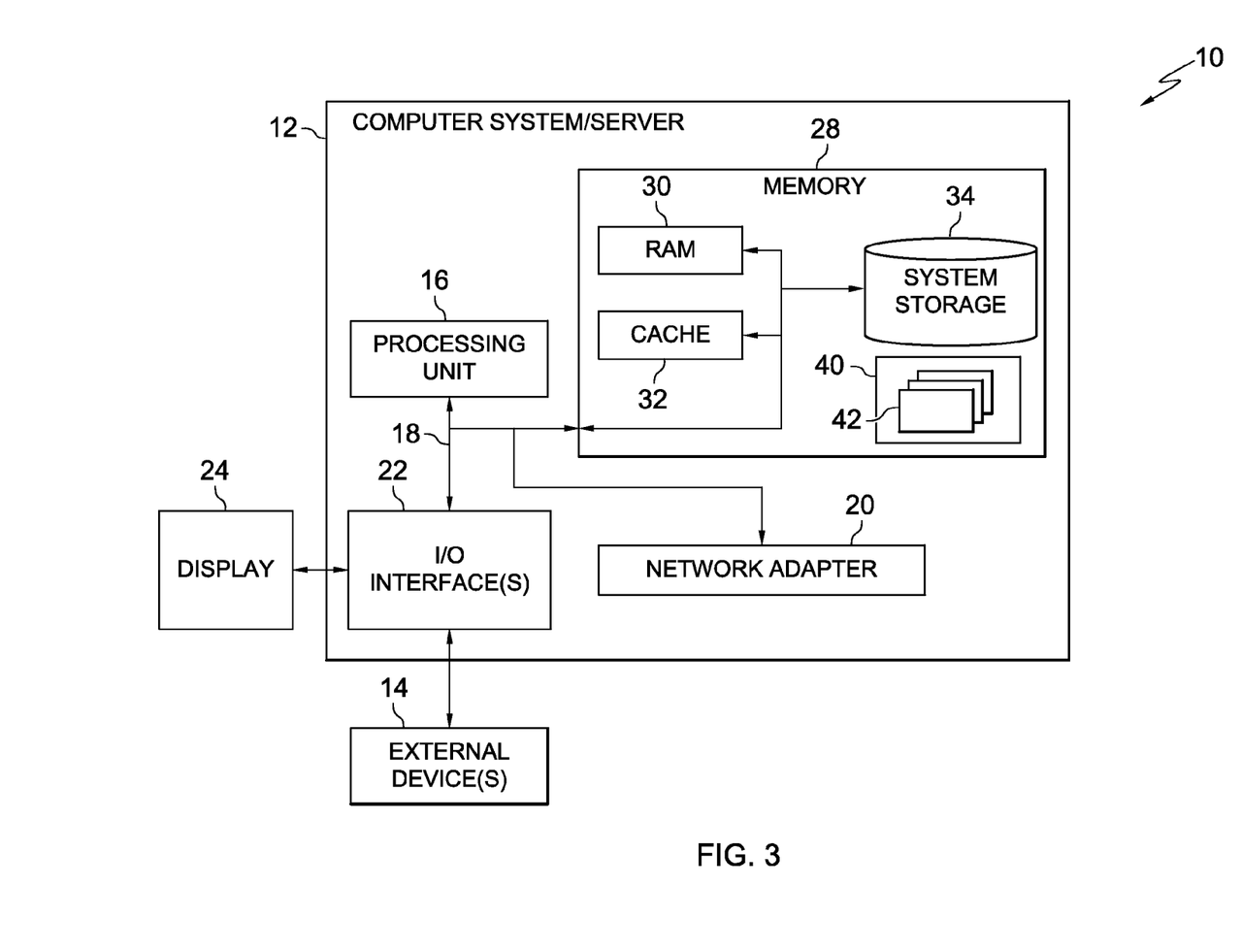
FIG. 3 a schematic block diagram illustrating a computer system, in accordance with an embodiment of the present invention.

Referring now to FIG. 3, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

Figure 4:
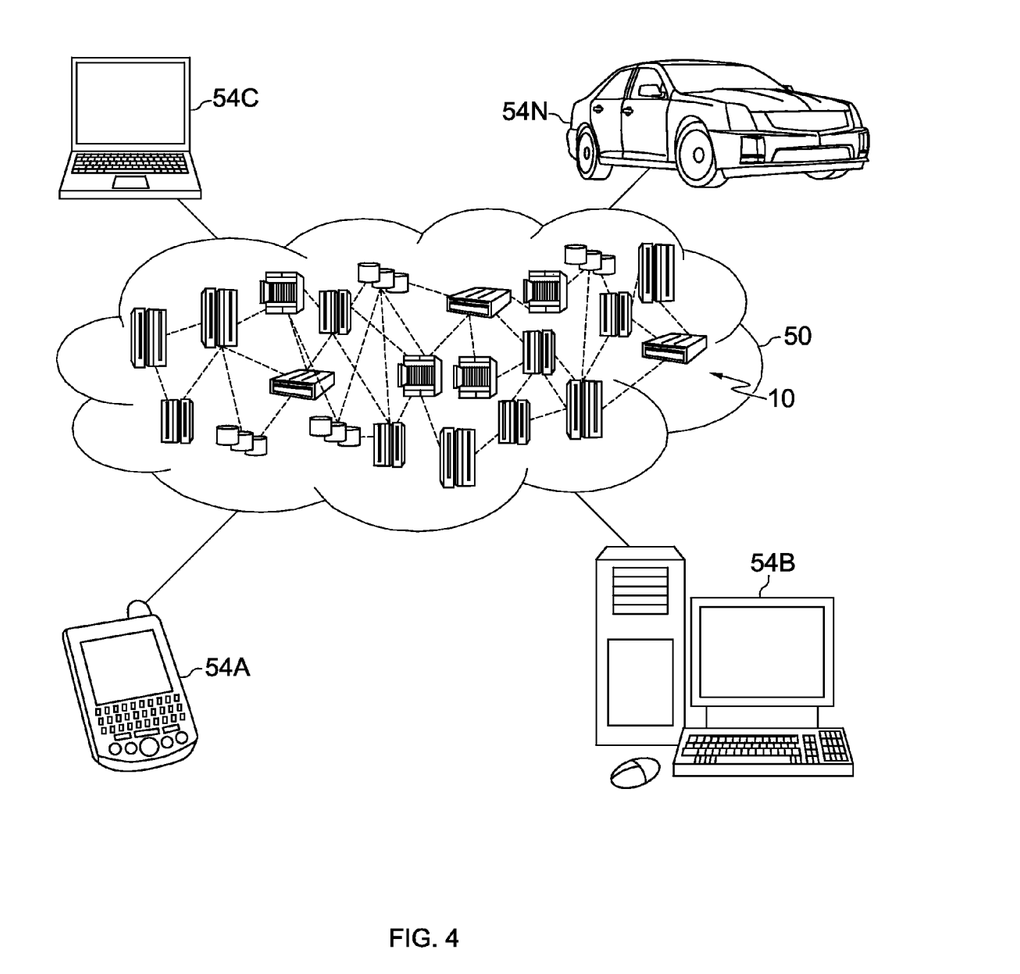
FIG. 4 is a schematic block diagram depicting an exemplary cloud computing environment, in accordance with an embodiment of the present invention.

As shown in FIG. 4, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processing units 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 5:
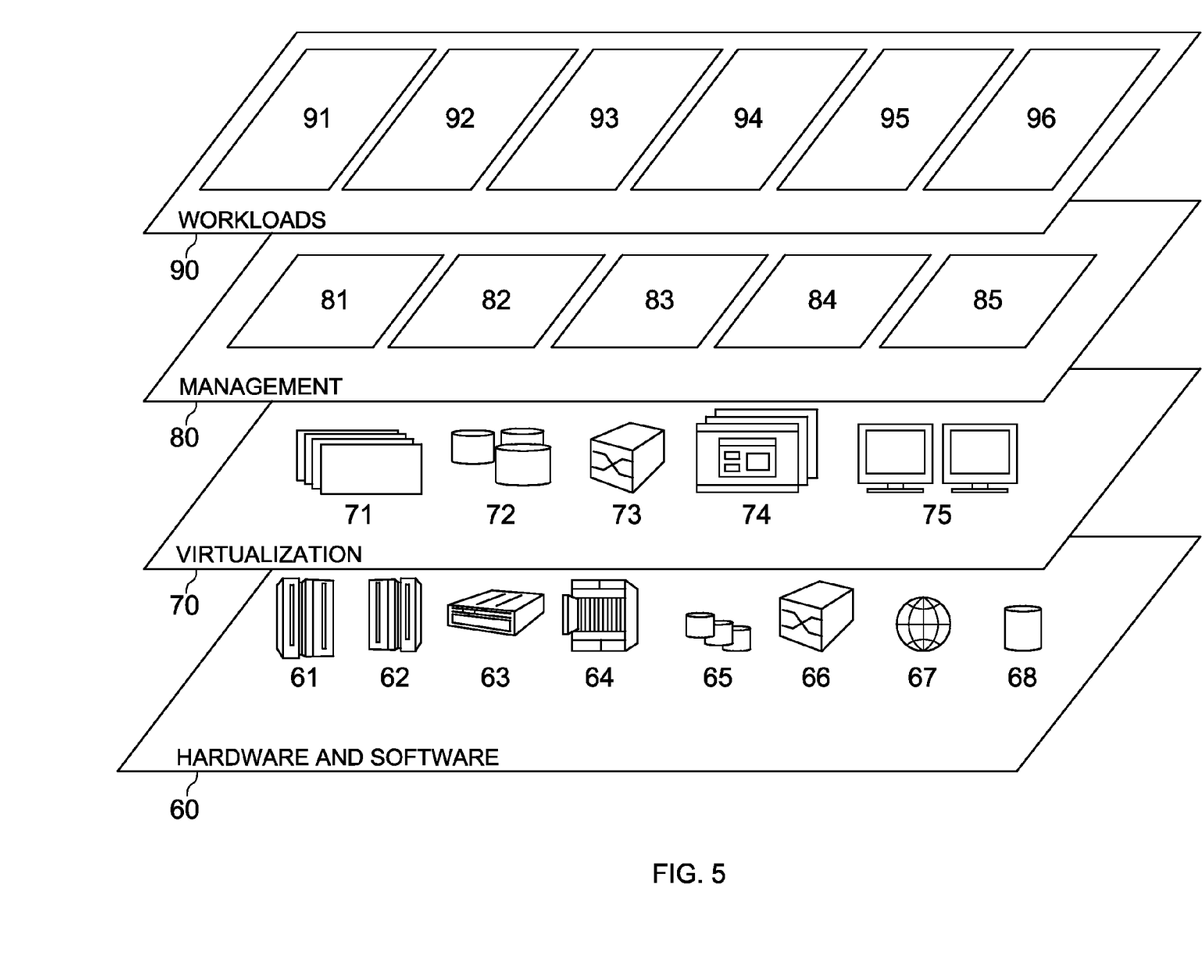
FIG. 5 is a schematic block diagram depicting a multi-layer functional embodiment of the cloud computing environment of FIG. 5, in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and call answering time estimation services 96.

In a related embodiment, cloud migration services may be performed as part of management layer 80.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A method for estimating an answering time of a communication by a user on a communication device, the method comprising:

receiving the communication on a first communication device from a second communication device;

determining a distance of a user from the first communication device;

estimating a time for the user to reach the first communication device based on the distance determination; and communicating the estimated time to the second communication device.

2. The method of claim 1, wherein the determining the distance comprises identifying the user from among one or more detected objects.

3. The method of claim 1, wherein determining the distance comprises establishing a distance between the first communication device and a wearable device associated with the user.

4. The method of claim 1, wherein the estimating the time is based on at least a prior record of time for the user to reach the first communication device.

5. The method of claim 1, wherein the estimating the time is based on at least a health condition of the user.

6. The method of claim 1, wherein the estimating the time is based on at least a sleep status of the user.

7. The method of claim 1, further comprising:

communicating a dimensional representation of the user's environment to the second communication device.

8. A computer program product for estimating an answering time of a communication by a user on a communication device, the computer program product comprising a computer readable storage medium having program instructions embodied therewith, wherein the computer readable storage medium is not a transitory signal per se, the program instructions executable by a computer to cause the computer to perform a method comprising:

receiving, by a first communication device, the communication from a second communication device;

determining a distance, by a computer, of a user from the first communication device;

estimating a time, by a computer, for the user to reach the first communication device based on the distance determination; and communicating the estimated time, by a computer, to the second communication device.

9. The computer program product of claim 8, wherein the determining the distance comprises identifying the user among one or more detected objects.

10. The computer program product of claim 8, wherein the determining the distance comprises establishing a distance between the first communication device and a wearable device associated with the user.

11. The computer program product of claim 8, wherein the estimating the time is based on at least a prior record of time for the user to reach the first communication device.

12. The computer program product of claim 8, wherein the estimating the time is based on at least a health rating of the user.

13. The computer program product of claim 8, wherein the estimating the time is based on at least a sleep status of the user.

14. The computer program product of claim 8, further comprising:

communicating a dimensional representation of the user's environment to the second communication device.

15. A computer system for estimating an answering time of a communication by a user on a communication device, the computer system comprising:

one or more computer processors;

one or more computer-readable storage media;

program instructions stored on computer-readable storage media for execution by at least one of the one or more processors, the program instructions comprising:

program instructions to receive the communication on a first communication device from a second communication device;

program instructions to determine a distance of a user from the first communication device;

program instructions to estimate a time for the user to reach the first communication device based on the distance; and program instructions to communicate the estimated time to the second communication device.

16. The system of claim 15, wherein the instructions to determine the distance comprise identifying the user among one or more detected objects.

17. The system of claim 15, wherein the instructions to determine the distance comprise instructions to establish a distance between the first communication device and a wearable device associated with the user.

18. The system of claim 15, wherein the instructions to estimate the time comprise a prior record of time for the user to reach the first communication device.

19. The system of claim 15, wherein the instructions to estimate the time comprise a health condition of the user.

20. The system of claim 15, further comprising:

instructions to communicate a dimensional representation of the user's environment to the second communication device.

* * * * *